United States Patent [19]
Manganaro et al.

[11] Patent Number: 5,470,564
[45] Date of Patent: * Nov. 28, 1995

[54] METHOD FOR PRODUCING CARO'S ACID

[75] Inventors: James L. Manganaro, Princeton; Martin E. Sacks, East Windsor, both of N.J.; James Carmichael, Buffalo, N.Y.

[73] Assignee: FMC Corporation, Philadelphia, Pa.

[*] Notice: The portion of the term of this patent subsequent to Aug. 8, 2012, has been disclaimed.

[21] Appl. No.: 351,987

[22] Filed: Dec. 8, 1994

Related U.S. Application Data

[63] Continuation-in-part of Ser. No. 283,348, Aug. 1, 1994.
[51] Int. Cl.$^6$ ................................................. C01B 17/98
[52] U.S. Cl. ................................................. 423/521
[58] Field of Search ............................................ 423/521

[56] References Cited

U.S. PATENT DOCUMENTS 2,926,998  3/1960  D'Addieco et al. ................. 423/521
5,141,731  8/1992  Meier et al. ........................ 423/521

OTHER PUBLICATIONS

WO 92/11200 published Jul. 9, 1992 (McDonough et al.).
WO 92/07791 published May 14, 1992 (Lane et al.).

*Primary Examiner*—Wayne Langel
*Attorney, Agent, or Firm*—Frank Ianno; Patrick C. Baker; Robert L. Andersen

[57] ABSTRACT

This invention relates to a process for producing Caro's acid by reaction of at least 85% by weight sulfuric acid and at least 50% by weight hydrogen peroxide wherein the sulfuric acid and hydrogen peroxide are fed through separate feed lines into a funneling zone open to the atmosphere, the feed lines having air gaps between their ends and the funneling zone; passing said hydrogen peroxide and sulfuric acid by gravity flow from said funneling zone into one end of a reaction zone whose size permits a pressure drop which is at least 8 times the theoretical pressure drop for such reaction zone and removing a mixture containing Caro's acid from the exit end of the reaction zone.

12 Claims, 2 Drawing Sheets

METHOD FOR PRODUCING CARO'S ACID

This is a continuation-in-part of U.S. application Ser. No. 08/283,348, filed Aug. 1, 1994.

FIELD OF THE INVENTION

The invention is in the field of producing Caro's acid by reaction of hydrogen peroxide and sulfuric acid in a controlled and effective manner.

DESCRIPTION OF PRIOR ART

Caro's acid, which is peroxymonosulfuric acid, is a strong oxidizing compound which has been suggested for use in many applications including purification of cyanide-containing effluents by conversion of their cyanides into non-toxic derivatives. Caro's acid is usually produced by reacting together concentrated sulfuric acid (85% to 98% by weight $H_2SO_4$) with concentrated hydrogen peroxide (50% to 90% by weight $H_2O_2$) to produce an equilibrium mixture of Caro's acid containing peroxymonosulfuric acid ($H_2SO_5$), sulfuric acid and hydrogen peroxide. However, since the Caro's acid is not stable for long periods it must be made and immediately used on site or quickly cooled and stored at refrigerated temperatures. In general, the Caro's acid is manufactured on site as needed and in just the amounts required for the specified application without the necessity of having to store any excess amounts.

one procedure for producing Caro's acid is set forth in U.S. Pat. No. 3,900,555 by using an apparatus described in U.S. Pat. No. 3,939,072 for mixing the sulfuric acid and hydrogen peroxide and cooling the mixture with a water-cooled jacket to prevent overheating of the reactants and premature decomposition of the monoperoxysulfuric acid product. These patents teach the use of the monoperoxysulfuric acid product for treating waste aqueous effluents from an electroplating plant containing cyanide ions while simultaneously adding an alkali in amounts suitable for neutralizing the added acid. This assures that the pH of the treated solution in maintained at a specified alkaline value, normally pH 9, by neutralizing any acidity resulting from the added acid.

Another procedure is set forth in U.S. Pat. No. 4,915,849 wherein the Caro's acid is used to treat cyanide-containing effluents from an ore-processing plant. The Caro's acid is manufactured by reacting sulfuric acid with hydrogen peroxide in proportions corresponding to between 0.01 and 0.5 moles of sulfuric acid per mole of hydrogen peroxide. The resulting acid is then added to the cyanide-containing effluent simultaneous with aqueous lime or sodium hydroxide mixtures in order to maintain the effluent at the preferred pH of between 9.5 and 11.5.

Still another procedure is set forth in PCT Publication No. WO 92/07791, a published patent application of Lane et al, which teaches production of peroxymonosulfuric acid by introducing a hydrogen peroxide solution into a stream of sulfuric acid flowing through a reaction chamber, the $H_2O_2$ introduction being intermediate the sulfuric acid inlet and the reaction mixture outlet. Both the hydrogen peroxide solution and sulfuric acid are introduced under pressure into the closed tubular reaction chamber of the invention. In the reaction chamber, the through-put per minute of the reaction chamber is at least about 20 times its internal volume measured between the inlet for the hydrogen peroxide and the outlet.

In carrying out the production of Caro's acid in industrial applications, two problems have arisen in the scale-up of the Caro's acid generating unit to commercial proportions. The first problem is the protection of a large amount of hydrogen peroxide in storage tanks, used to feed the Caro's acid producing generator, from possible contamination. The need to prevent contamination of this large hydrogen peroxide source from either Caro's acid, sulfuric acid, or other such impurities is critical to the safe containment and use of the hydrogen peroxide. The second problem is to control the Caro's acid reaction so that the Caro's acid is formed efficiently with maximum use of the hydrogen peroxide reagent and without having the hot reaction mixture formed during the reaction go out of control and overflow or rupture the reaction chamber.

With respect to the first problem, it has been the custom in the industry to isolate the storage tank of peroxide from the reactor where Caro's acid is produced by means of an intermediate tank (sometimes called a "break" tank) to interrupt the stored hydrogen peroxide source from the line delivering hydrogen peroxide to the Caro's acid generator. The peroxide from the storage tank is passed by pump means or by gravity into the top of an intermediate tank to a given level in the intermediate tank without requiring a direct liquid connection between the peroxide in the intermediate tank and the line flowing from the storage tank. This assures that any possible contamination which may be sucked back from the Caro's acid generator into the intermediate tank will not be able to flow into the hydrogen peroxide storage tank.

The second problem arises because the reaction of sulfuric acid and hydrogen peroxide is an exothermic reaction and some hydrogen peroxide decomposes to form large amounts of gas which may cause pressure build up capable of rupturing the reactor or causing the reagents to overflow. This may cause the hot reaction mixture to go out of control with the waste of both sulfuric acid and hydrogen peroxide and further, if no break tank is used, may become a possible source of contamination of the hydrogen peroxide storage tank if it backs up into the hydrogen peroxide line connecting the hydrogen peroxide storage tank to the Caro's acid reactor.

SUMMARY OF THE INVENTION

We have now found a process for producing Caro's acid by reacting sulfuric acid having a concentration of at least about 85% by weight and hydrogen peroxide having a concentration of at least about 50% by weight, wherein the hydrogen peroxide is introduced through a first feed line and the sulfuric acid is introduced through a second feed line into a funneling zone open to the atmosphere, the first feed line and second feed line having air gaps between their ends and the funneling zone, passing said hydrogen peroxide and sulfuric acid by gravity flow from said funneling zone into one end of a reaction zone that has been sized to permit a pressure drop therein which is at least 8 times the theoretical pressure drop for liquids flowing through such reaction zone and removing a mixture containing Caro's acid from an exit end of the reaction zone.

DRAWINGS

In the drawings, FIG. 1 is a flow sheet showing the present process for producing Caro's acid. FIG. 2 is a graph showing the theoretical pressure drop in pounds per square inch through a given static reactor at various total flow rates as compared with the actual results obtained by measuring the pressure drop against the same total flow rate measured in gallons per minute.

DETAILED DESCRIPTION OF THE INVENTION

Figure 1:
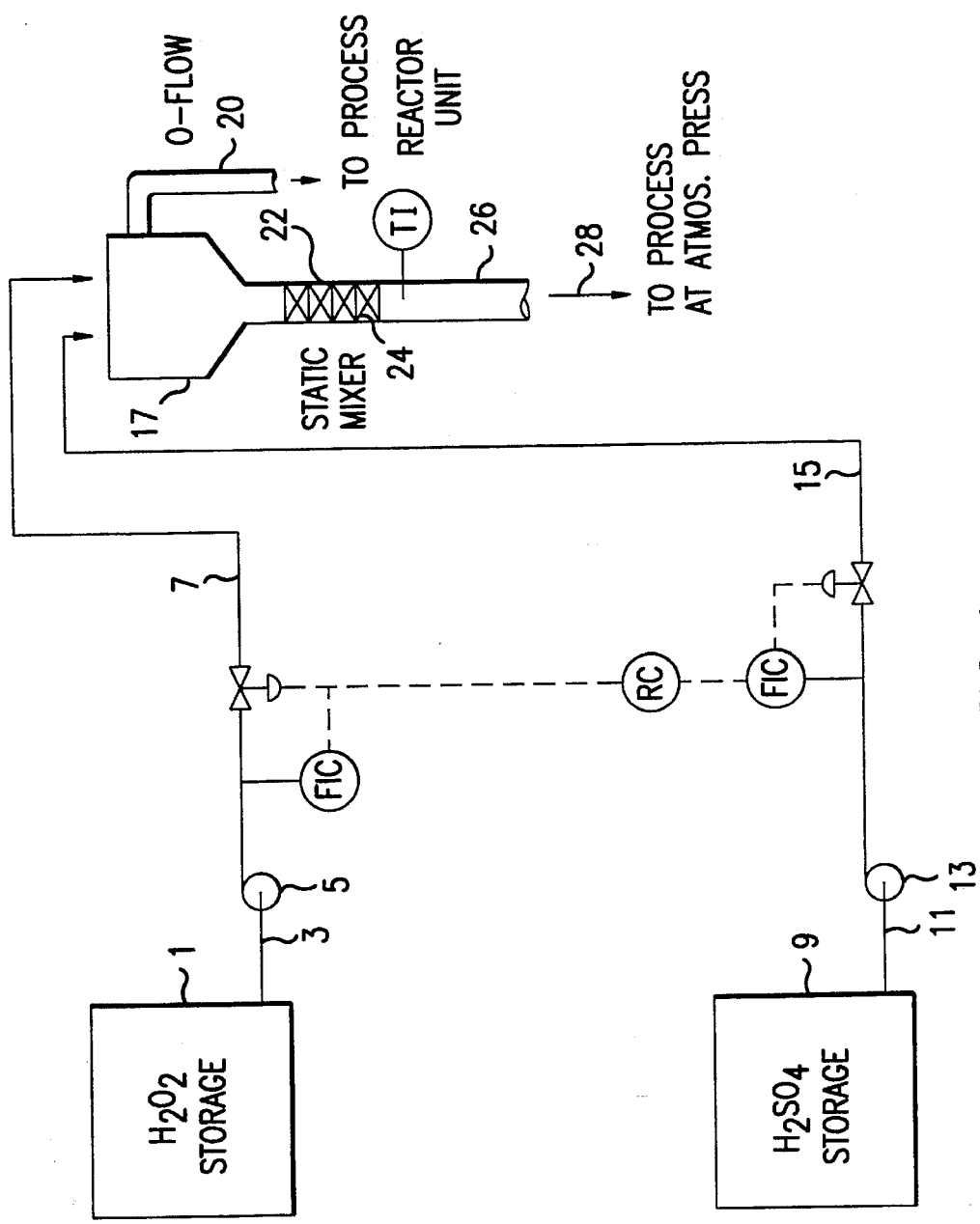

In carrying out the present process, the Caro's acid is produced by reacting sulfuric acid and hydrogen peroxide together, preferably in a continuous manner, by adding these reactants into a funneling zone opened to the atmosphere and then allowing the hydrogen peroxide and sulfuric acid to flow from the funneling zone by gravity into one end of a reaction zone where the reaction takes place. The feed lines conveying the sulfuric acid and the hydrogen peroxide to the funneling zone have air gaps between the ends of these lines and the top of the funneling zone so that none of the reactants can overflow and enter into the feed lines of either the hydrogen peroxide and/or sulfuric acid. The reaction zone located downstream from the funneling zone into which the reactants from the funneling zone are passed is preferably a pipe-like or tube reactor, whose diameter may be variable or constant, which may be either vertically oriented, horizontally oriented or any skew angle intermediate these two extremes and is fed by gravity from the funneling zone. Further, the reaction zone must have a size which permits a pressure drop in the zone which is at least 8 times the theoretical pressure drop for liquids passing through such reaction zone. Such reaction zones are normally static reactors containing several mixing elements which ensure a complete mixing and reaction of the two reactants.

The sulfuric acid can be of any concentration from about 85% by weight to up to about 98% by weight $H_2SO_4$ with about 93% weight percent sulfuric acid being preferred because of its ready availability and workability. Hydrogen peroxide can be of any concentration from about 50% weight percent $H_2O_2$ to about 90% weight percent $H_2O_2$ with 70% weight percent hydrogen peroxide preferred because of safety consideration and because the lower amount of water in the 70 weight percent hydrogen peroxide is desirable in this system. The mole ratios of sulfuric acid to hydrogen peroxide ($H_2SO_4/H_2O_2$) can range from about 1/1 to about 3/1 with about 2/1 to about 2.5/1 being preferred. The reaction results in Caro's acid being formed in a solution which is an equilibrium mixture of hydrogen peroxide, sulfuric acid, Caro's acid and water. The equation for this reaction is set forth below:

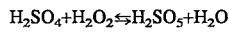
$$H_2SO_4 + H_2O_2 \rightleftharpoons H_2SO_5 + H_2O$$

In this reaction, the presence of water in the reaction mixture is undesirable since it acts to inhibit formation of $H_2SO_5$ and to hydrolyze the resulting $H_2SO_5$ back into $H_2SO_4$ and $H_2O_2$. For this reason, it is desired to minimize the presence of water by using concentrated sulfuric acid and concentrated hydrogen peroxide to increase the yield of Caro's acid. Further, since sulfuric acid is a very strong dehydrating agent, it is desired to employ excess amounts of sulfuric acid relative to the water formed in the reaction so that it takes up the water as a hydrate and prevents it from inhibiting the Caro's acid formation in the reaction. However, use of extremely large amounts of sulfuric acid is wasteful since the additional amounts of Caro's acid formed is not commensurate with the cost of the excess sulfuric acid required to obtain the somewhat higher amounts of Caro's acid formed. For these reasons, the optimum ratio for producing Caro's acid commensurate with economical amounts of sulfuric acid employed is obtained when the mole ratio of $H_2SO_4/H_2O_2$ is about 2/1 to about 2.5/1. A typical composition prepared from a 2.5/1 mole ratio of 93 weight percent sulfuric acid and 70 weight percent hydrogen peroxide is as follows: Caro's acid (peroxymonosulfuric acid) 25 weight percent; sulfuric acid 57 weight percent; hydrogen peroxide 3.5 weight percent; and water 14.5 weight percent.

In carrying out this reaction, we have found that the pressure generated in the reaction zone does not drop off, at various flow rates through the reaction zone, as one would anticipate based on the theoretical formula developed for typical static reaction zones. This is due to the accelerated decomposition of the hydrogen peroxide reactant with release of voluminous gases to an extent much greater than would have been predicted for such reaction. In most cases, the predicted pressure drop was on the order of ⅛ of the actual pressure drop obtained during testing and in many cases the predicted pressure drop was only 1/10 of that actually obtained in actual testing of these static reactors.

In the preferred embodiment, the funneling zone empties by gravity into an essentially vertical, pipe-like, static reactor containing 3 or 4 static mixing elements, such as those manufactured by Koch Engineering Company, and designated as SMV$^R$ static mixers. These static reactors are advantageous because they result in almost instantaneous reaction, have little hold up, operate in a continuous manner and need no mechanical or moving mixing devices to obtain complete mixing and reaction to form Caro's acid. The minimal hold up reduces decomposition, heat and pressure buildup and generally avoids run away reactions. The design is such that the funneling vessel freely drains into the static reactor and the static reactor is of sufficient diameter so that little or no hold up exists in the funneling vessel, i.e., the reactants essentially immediately contact the static mixing elements and mix with little or no solution being held up in the funneling zone. Little or no hold up in the funneling vessel is desirable in order to avoid prolonged residence times and uncontrolled and unwanted variations in $H_2SO_4/H_2O_2$ mole ratios. Both of these factors, namely prolonged residence times and unwanted $H_2SO_4/H_2O_2$ mole ratios have the potential for causing a thermal run away.

In carrying out the present process, the funneling zone is always kept open to the atmosphere to prevent any possible build up of pressure caused by the release of gases during the reaction to form Caro's acid. The absence of any possible pressure build up assures that the reaction mixture can never be forced back up the funneling zone and be propelled up into the tubes supplying either the hydrogen peroxide or sulfuric acid to the funneling zone. In the event of an excessive surge of gases, the reactants in the funneling zone can rise and even overflow the ends of the funneling zone without contaminating the ends of the feed tubes supplying the hydrogen peroxide and sulfuric acid because of the air gap which is always maintained between the end of these tubes and the beginning of the funneling zone. The funneling zone can be formed from a simple funnel shaped unit to assure that both the peroxide and sulfuric acid are added together into the reaction zone where they mix and react to form the Caro's acid. Although not necessary, it is often helpful if the top of the funneling zone has an overflow tube installed to drain any possible overflow of reactants so the overflow liquid can flow out of the funneling zone through a down spout and be combined with the Caro's acid removed from the reaction zone.

In carrying out the present process, the funneling zone and the reaction zone each have one end with direct access to the atmosphere and are thus unable to have any pressure build ups. The design is such that the maximum hydrostatic head which accumulates in the funneling zone is maintained very low, not above about 2 to 4 inches of liquid to prevent build up of reactants in the zone. The hold up of much more than this amount of liquid represents a potential for an accelerating rate decomposition in the entire mass of solution. To avoid this serious safety concern, the static reactor is designed to have a diameter which will limit the hydrostatic head, maintain the solution hold up in the reactor within acceptable limits, and avoid accumulating large amounts of reactants in the funneling zone with the potential for a run away reaction. The use of gravity feed into the reaction zone from the funneling zone also assures maintaining the hydrostatic head in the funneling zone within desirable limits. The use of pumps to feed the mixture from the funneling zone into an undersized reaction zone under pressure is undesirable since a pump failure may result in an overly exothermic and uncontrolled reaction leading to an increased hydrostatic head being built up in the funneling zone. By operating as described above, the Caro's acid is formed essentially on a continuous basis in the reaction zone without pressure build ups and without excessive hydrostatic heads in the funneling zone and therefore without large amounts of hot Caro's acid backing up into the funneling zone which leads to possible uncontrolled and run away reactions of the hot Caro's acid. A key element in achieving these ends is of course sizing the reaction zone so that the pressure drop across the reaction zone is at least 8 times the theoretical pressure drop for liquids through such reaction zones. This can assure that the pressure drop across the reaction zone results in a maximum hydrostatic head in the funneling zone of no more than a few inches, which is acceptable. If the reaction zone were based on the theoretical calculations for such pressure drop, the hydrostatic head would be unacceptably larger and would pose a safety hazard because of the large amount of hot decomposing Caro's acid solution backing up into the funneling zone.

The invention will now be described with reference to the drawings. In FIG. 1, the hydrogen peroxide is maintained in a storage tank 1 and passed via line 3 into pump 5 which pumps the liquid through line 7 into the funneling zone 17. In similar fashion, the sulfuric acid is maintained in storage tank 9 and is passed through line 11 into pump 13 where the sulfuric acid is pumped through line 15 into the top of the funneling unit 17. The use of pumps 5 and 13 are optional since the reactants can also be passed by gravity into the top of the funneling zone when pumping means are not required.

In either case, rate controllers are normally used in these lines to assure that the mole ratio of sulfuric acid to hydrogen peroxide is within the range of 1/1 to about 3/1 with 2/1 to about 2.5/1 being preferred. The ends of lines 7 and 15 are located above the top of the funneling zone 17 to assure that an air space always remains between the ends of these lines and the funneling zone. This air space is necessary to assure that if the reactants overflow the top of the funneling zone none of the reactants, hydrogen peroxide and sulfuric acid, will enter either line 7 or line 15 and cause contamination of any of the storage tanks.

The funneling zone 17 is in the form of a funnel and is designed to permit simultaneous adding of the reactants. The hold up of reactants in this funneling zone is desired to be maintained as small as possible, for example, no more than about 2 to 4 inches in height to avoid the potential for an accelerating rate decomposition. The top of the funneling zone is always left open to the atmosphere to prevent any pressure build up. If desired, a loosely fitted dust cover may be placed over the top of the funnel with appropriate openings for the ends of the feed lines 7 and 15. Dust covers serve to prevent unwanted particles and contamination from entering into the funneling zone without forming a pressure cap.

In addition, the funneling zone 17 normally is equipped with an overflow 20. The overflow 20 is designed to remove any overflowing liquid from the funneling zone which accumulates above the hold-up liquid level normally obtained and to remove any such liquid from the funneling zone before it overflows the funneling zone 17. Any reagents which overflow and are removed via line 20 are then mixed with the Caro's acid mixture removed from the reaction zone.

The bottom of the funneling zone is connected to a static reactor 22. The initially added sulfuric acid and hydrogen peroxide in funneling unit 17 are then passed by gravity into the static reactor 22 in order to intimately mix these reactants to maximize conversion to Caro's acid. The pipe-like static reactor 22 has internal elements 24, usually 3 or 4, to facilitate intimate mixing of hydrogen peroxide and sulfuric acid. The static reactor 22 is shown in a vertical orientation and this is the preferred embodiment for carrying out this process. However, it is possible to connect the static reactor to the funneling zone with a curved connection and have the static reactor either in a horizontal or diagonal figuration. Whether the static reactor is oriented vertically, diagonally or horizontally, the gravity fed reactants from the funneling zone 17 will flow into and intimately react in the static reactor 22 and be converted to Caro's acid.

A typical static reactor is that produced by Koch Engineering Company containing four SMV$^R$ elements for intimately mixing and reacting the feed mixture to form Caro's acid. The exit 26 from the static reactor 22 conveys the Caro's acid mixture formed in the static reactor, at atmospheric pressure, to the application where the Caro's acid is being used. These include detoxification of cyanides and other well known applications for Caro's acid. The sizing of the static reactor 22 is most important to this process since it must permit a pressure drop which is at least 8 times the theoretical pressure drop for liquids passing through such reaction zones. This is reviewed in greater detail in the discussion of FIG. 2.

Figure 2:
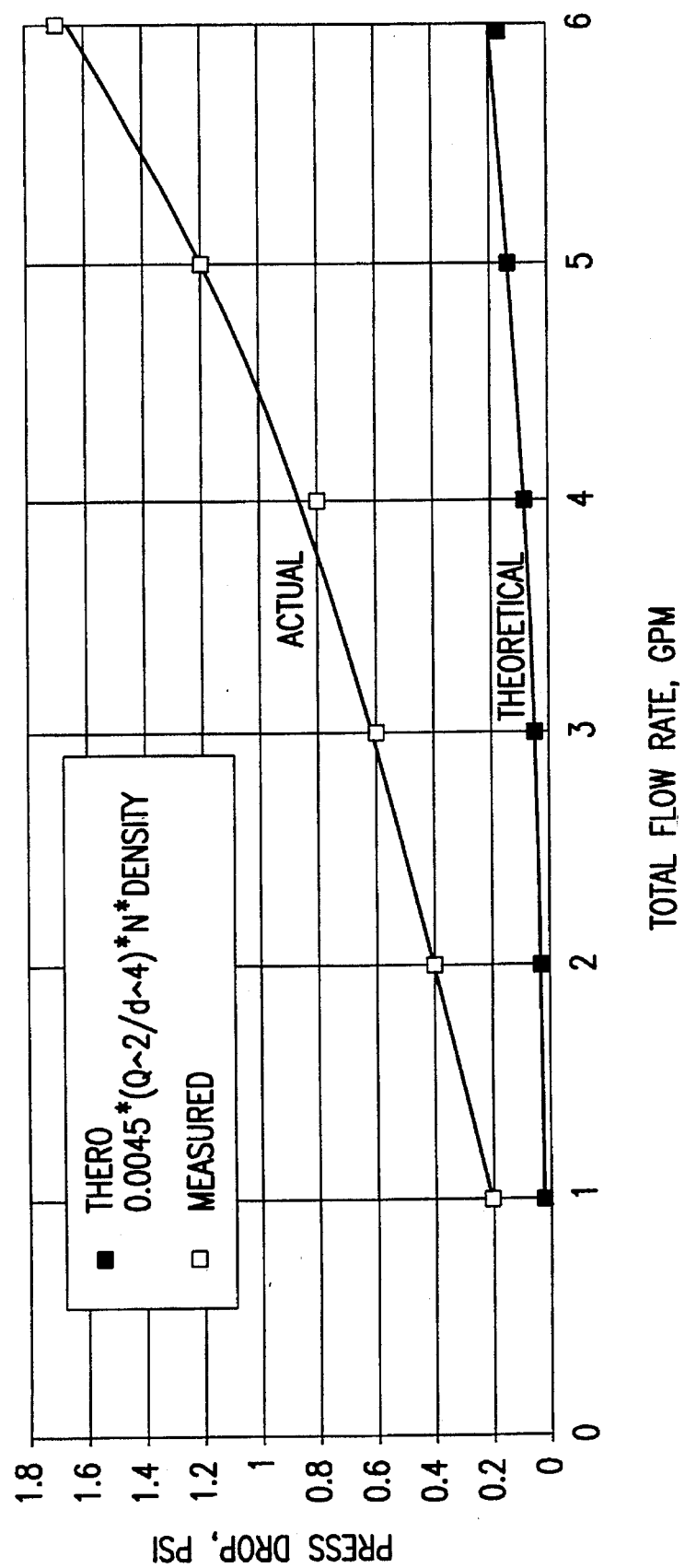

In FIG. 2, a graph is shown in which the horizontal axis is the total flow rate, in gallons per minute, of a Caro's acid mixture (specific gravity 1.65) versus a vertical axis indicating the pressure drop in pounds per square inch (psi) across a typical Koch Engineering Company design 1.5 inch diameter SMV$^R$ static reactor with four elements. The bottom curve shows the theoretical or calculated pressure drop that would be expected from this static reactor based on the formula set forth in the Koch Bulletin KSM-6 issued in 1991. The upper curve shows the actual pressure drop obtained. The formula for calculating the theoretical pressure drop is as follows:

$$\Delta P = 0.0045(Q^2/D^4)N(SG)$$

where $\Delta P$=pressure drop across the mixer, in psi
Q=flow rate of solution, gpm
D=diameter of element, inches
N=number of mixing elements
SG=specific gravity of the liquid As will be seen from the graph, the calculated pressure drop across the static reactor varies from about 0 to a high of about 0.2 psi at a flow rate of from 1 to 6 gallons per minute. This is the theoretical or calculated pressure drop based on the manufacturers empirical formula, given above, for his unit. In fact, when carrying out the present reaction to form Caro's acid, we have found the actual, measured pressure drop across this static reactor is shown in the upper curve. As will be seen from this upper curve when the flow rate is about 1 gallon per minute of Caro's acid mixture, the initial pressure drop across the static reactor is actually about 0.2 psi and unexpectedly climbs to as high as 1.7 psi at a flow rate of 6 gallons per minute of Caro's acid mixture.

In order to avoid this unexpected and greatly increased pressure drop, applicants' process sizes the static reactor to permit a pressure drop which is at least 8 times the theoretical pressure drop for liquids. That is, the size of the reactor is increased so that the pressure drop is reduced to at least ⅛ of the theoretical value for such static reaction unit. The same principal can be applied to any static reactor; the theoretical pressure drop with the Koch Engineering Company reactor is used simply as a typical example of such static reactors.

The Caro's acid which is removed from the exit tube 6 of the static reactor is fed to the application zone where the Caro's acid is used to carry out conventional oxidation functions. The Caro's acid leaving the static reactor via exit tube 26 is open to the atmosphere and thus is at atmospheric pressure. It is not pumped or in any way put under any pressure when removed from the static reactor zone to avoid creating back pressures in the static reactor. If, on occasion, there is a build up of liquid overflowing the funneling zone 17 any excess liquid removed through overflow 20 is also flowed to the application zone along with the regularly produced Caro's acid 28 from the exit pipe 26 of the static reactor 22.

Because of the poor stability of the Caro's acid thus formed at the elevated reaction temperatures, it is typical for the Caro's acid to be formed on site where it is to be used in the particular application. In practice, the Caro's acid thus formed is passed directly into the stream to be treated (for example, effluents where Caro's acid is used to reduce its cyanide concentration) without storing or transporting of the thus formed Caro's acid.

The following is an example which illustrates the use of the present process.

An apparatus was set up as shown in FIG. 1 for the delivery of up to 5.5 gallons per minute of Caro's acid solution. The funneling zone was in the form of a funnel having an upper cylindrical section one foot in diameter by one foot high. A static reactor was installed in a vertical position beneath the funnel so that liquid from the funneling zone would be fed by gravity directly into the static reactor. The static reactor was of tubular construction and was of a design by Koch Engineering Company that employed four $SMV^R$ elements 3 inches in diameter. The static reactor had a diameter of 3 inches and discharged into a 3-inch diameter tube which delivered the generated Caro's acid solution to a process application. In this example, the sulfuric acid employed was 93% by weight $H_2SO_4$ and the hydrogen peroxide employed was 70% by weight $H_2O_2$ and the mole ratio of $H_2SO_4$ to $H_2O_2$ was maintained at 2.5:1. At a production rate of 5.5 gallons per minute of Caro's acid the 3-inch diameter static reactor gives a pressure drop across the static reactor of 0.097 psi and this gives a hydrostatic head in the funneling zone of about 1.6 inches, which is considered an acceptable hydrostatic head and a safe amount of solution hold up. The static reactor delivers a Caro's acid solution at a rate of 5.5 gallons per minute from the static reactor to an applications area for use as an oxidizing mixture.

ALTERNATE RUN

An alternate run was carried out using a static reactor that had a diameter of 1.5 inches and discharged into a 1.5 inch diameter tube which delivered the generated Caro's acid solution to process. The Koch Bulletin KSM-6 entitled "Status Mixing Technology" dated 1991 suggests the following formula for calculating pressure drop for a $SMV^R$ type mixing element as follows:

$$\Delta P = 0.0045(Q^2/D^4)N(SG)$$

where $\Delta P$=diameter drop across the mixer, in psi
Q=flow rate of solution, in gpm
D=diameter of element, inches
N=number of mixing elements
SG=specific gravity Based on this formula, for the production of 5.5 gallons per minute of Caro's acid solution with a static reactor of 1.5 inch diameter containing four $SMV^R$ mixing elements, it is calculated from the above equation using the following values:

Q=5.5 gpm
D=1.5 inches
N=4
SG=1.65 (adjusted for a temperature of 80° C.) that the pressure drop across the static reactor would be about 0.18 psi. This would be equivalent to a hydrostatic height of about 3.0 inches of Caro's acid in the funneling zone. Such a calculated value would be acceptable. However, when the reactants were introduced into the reactor in practice, the hydrostatic drop across the static reactor was found to be 1.55 psi and this results in a hydrostatic head, not of the above calculated 3.0 inches, but of approximately 26 inches. This is an entirely unacceptable amount of hot decomposing Caro's acid solution which must be maintained in the funneling zone and represents a serious potential safety problem.

By using a static reactor as set forth in the above prior example of 3 inches (instead of 1.5 inches) in diameter, the pressure drop across the static reactor was reduced to 0.097 psig (instead of 1.55 psig) and this results in a hydrostatic head being reduced from 26 inches (in the 1.5 diameter static mixer) to about 1.6 inches (in the 3 inch diameter static mixer) which latter is an acceptable hydrostatic head and solution hold up.

It is thus seen from the above that the pressure drop for the static reactor in actual operation is entirely different from that obtained by theoretical calculation using the above formula for calculating the pressure drop of the static reactor. This is because of the high amount of gas evolution, principally oxygen, which takes place when sulfuric acid and hydrogen peroxide react at high temperatures to form Caro's acid. This was unknown prior to applicants' discovery of the extensive difference between the theoretical or calculated pressure drop and the actual pressure drop obtained when carrying out the reaction. By suitably designing the static reactor, the pressure drop can be maintained within acceptable limits and the hydrostatic head reduced to a point where the reagents hold up in the funneling zone can be brought down to an acceptable head of no more than about 2 to 4 inches.

We claim:

1. A process for producing Caro's acid by reacting sulfuric acid having a concentration of at least about 85% by weight and hydrogen peroxide having a concentration of at least about 50% by weight, wherein the hydrogen peroxide is introduced through a first feed line and the sulfuric acid is introduced through a second feed line into a funneling zone open to the atmosphere, the first feed line and second feed line having air gaps between their ends and the funneling zone, passing said hydrogen peroxide and sulfuric acid by gravity flow from said funneling zone into one end of a reaction zone that has been sized to permit a pressure drop therein which is at least 8 times the theoretical pressure drop for liquids flowing through such reaction zone and removing a mixture containing Caro's acid from an exit end of the reaction zone.

2. Process of claim 1 wherein the sulfuric acid has a concentration of about 85% to about 98% by weight $H_2SO_4$.

3. Process of claim 1 wherein the sulfuric acid has a concentration of about 93% by weight $H_2SO_4$.

4. Process of claim 1 wherein the hydrogen peroxide has a concentration of about 50% to about 90% by weight $H_2O_2$.

5. Process of claim 1 wherein the hydrogen peroxide has a concentration of about 70% by weight $H_2O_2$.

6. Process of claim 1 wherein the mole ratio of $H_2SO_4$ to $H_2O_2$ employed is about 1:1 to about 3:1.

7. Process of claim 1 wherein the mole ratio of $H_2SO_4$ to $H_2O_2$ employed is about 2:1 to about 2.5:1.

8. Process of claim 1 wherein the reaction zone has a tube-like shape.

9. Process of claim 8 wherein the reaction zone is a static reaction zone.

10. Process of claim 9 wherein the static reaction zone has a plurality of internal elements to facilitate mixing.

11. Process of claim 9 wherein the static reaction zone is vertically oriented.

12. Process of claim 1 wherein the funneling zone is equipped with an overflow means for removing any overflowing reactants in the funneling zone from contacting the first or second feed lines.

* * * * *